US012800147B2

(12) United States Patent
McCaldon

(10) Patent No.: US 12,800,147 B2
(45) Date of Patent: Nov. 17, 2026

(54) CENTRAL AIR PASSAGE WITH RADIAL FUEL DISTRIBUTOR

(71) Applicant: Pratt & Whitney Canada Corp., Longueuil (CA)

(72) Inventor: Kian McCaldon, Orangeville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/104,899

(22) Filed: Feb. 2, 2023

(65) Prior Publication Data

US 2024/0263786 A1 Aug. 8, 2024

(51) Int. Cl.
*F23R 3/28* (2006.01)
*F02C 3/22* (2006.01)
*F23D 14/14* (2006.01)
*F23D 14/82* (2006.01)

(52) U.S. Cl.
CPC ................ *F23R 3/286* (2013.01); *F02C 3/22* (2013.01); *F23D 14/14* (2013.01); *F23D 14/82* (2013.01)

(58) Field of Classification Search
CPC .. F23R 3/286; F02C 3/22; F23D 14/14; F23D 14/82
See application file for complete search history.

(56) References Cited

U.S. PATENT DOCUMENTS 2,984,978 A * 5/1961 Griffith ................... F02C 7/224 60/39.15
3,859,787 A * 1/1975 Anderson ................. F23R 3/28 60/39.23
3,927,520 A * 12/1975 Arvin ......................... F23R 3/26 60/39.23
3,930,369 A * 1/1976 Verdouw ................... F23R 3/30 60/39.23
3,938,324 A * 2/1976 Hammond, Jr. .......... F23R 3/16 60/39.23
3,958,416 A * 5/1976 Hammond, Jr. .......... F23R 3/34 60/39.23
4,100,733 A * 7/1978 Striebel ................... F23R 3/286 239/431

(Continued)

FOREIGN PATENT DOCUMENTS

CN 101220955 7/2008
CN 206113000 4/2017

(Continued)

OTHER PUBLICATIONS

Extended European Search Report for European Application No. 24154534.2 mailed May 28, 2024.

*Primary Examiner* — Lorne E Meade
(74) *Attorney, Agent, or Firm* — Carlson, Gaskey & Olds, P.C.

(57) ABSTRACT

A fuel mixture distribution system for a turbine engine assembly includes a combustor that includes a combustion chamber, a fuel mixture distributor that includes an air conduit defining a mixing chamber between an air inlet and an exit opening to the combustion chamber, and a plurality of fuel passages that are disposed in the air conduit where a fuel flow is introduced and mixed with air in the mixing chamber prior to flowing through the exit opening into the combustion chamber. The air conduit shape is defined to achieve the desired mixing and prevent flashback at all operating conditions.

15 Claims, 5 Drawing Sheets

(56) References Cited

U.S. PATENT DOCUMENTS

| | | | | |
|---|---|---|---|---|
| 4,262,482 | A * | 4/1981 | Roffe | F23R 3/30 60/39.463 |
| 4,373,899 | A * | 2/1983 | Markus | F23C 7/06 431/351 |
| 5,251,447 | A * | 10/1993 | Joshi | F23R 3/14 431/185 |
| 5,351,477 | A | 10/1994 | Joshi et al. | |
| 5,613,363 | A | 3/1997 | Joshi et al. | |
| 5,675,971 | A | 10/1997 | Angel et al. | |
| 5,718,573 | A * | 2/1998 | Knight | F23D 14/62 431/353 |
| 7,832,212 | B2 | 11/2010 | Bunker | |
| 7,870,736 | B2 | 1/2011 | Homitz et al. | |
| 8,266,911 | B2 | 9/2012 | Evulet | |
| 8,413,445 | B2 | 4/2013 | Poyyapakkam | |
| 8,539,773 | B2 * | 9/2013 | Ziminsky | F23R 3/34 60/737 |
| 8,661,779 | B2 | 3/2014 | Laster et al. | |
| 8,887,506 | B2 | 11/2014 | Cai et al. | |
| 8,893,500 | B2 | 11/2014 | Oskam | |
| 8,925,323 | B2 | 1/2015 | Zuo | |
| 9,182,123 | B2 * | 11/2015 | Boardman | F23R 3/286 |
| 9,341,376 | B2 * | 5/2016 | Westmoreland, III | F23R 3/286 |
| 9,506,654 | B2 * | 11/2016 | Uhm | F23D 14/82 |
| 9,771,869 | B2 | 9/2017 | Li et al. | |
| 9,933,162 | B2 * | 4/2018 | Inoue | F23R 3/46 |
| 9,976,522 | B2 | 5/2018 | Patel et al. | |
| 10,082,294 | B2 | 9/2018 | Laster et al. | |
| 10,267,522 | B2 | 4/2019 | Ciani et al. | |
| 10,502,425 | B2 | 12/2019 | Boardman et al. | |
| 10,612,470 | B2 | 4/2020 | Matsuyama et al. | |
| 10,704,786 | B2 | 7/2020 | Laster et al. | |
| 10,865,989 | B2 | 12/2020 | Sadasivuni | |
| 10,941,940 | B2 | 3/2021 | Bulat et al. | |
| 11,067,280 | B2 | 7/2021 | Boardman et al. | |
| 2010/0251719 | A1 | 10/2010 | Mancini et al. | |
| 2011/0000214 | A1 | 1/2011 | Helmick et al. | |
| 2011/0185703 | A1 | 8/2011 | Dodo et al. | |
| 2012/0227411 | A1 | 9/2012 | Carroni et al. | |
| 2013/0086910 | A1 | 4/2013 | Khan et al. | |
| 2017/0227224 | A1 | 8/2017 | Oskam et al. | |
| 2017/0307210 | A1 | 10/2017 | Hirano et al. | |
| 2021/0172413 | A1 | 6/2021 | Snyder | |
| 2022/0290862 | A1 | 9/2022 | Kediya et al. | |

FOREIGN PATENT DOCUMENTS

| | | |
|---|---|---|
| EP | 1923637 | 5/2008 |
| JP | 2013108667 | 6/2013 |
| JP | 5538113 | 7/2014 |
| JP | 5926635 | 5/2016 |
| WO | 2016051756 | 4/2016 |
| WO | 2020259918 A1 | 12/2020 |
| WO | 2020259919 | 12/2020 |

* cited by examiner

CENTRAL AIR PASSAGE WITH RADIAL FUEL DISTRIBUTOR

BACKGROUND

A gas turbine engine ignites a mixture of compressed air with fuel in a combustor to generate a high temperature exhaust gas flow. The exhaust gas flow expands through a turbine to generate shaft power that is utilized to drive a propulsor and engine accessory components. Conventional hydrocarbon fuels are introduced into a combustor in a liquid form. The liquid fuel is atomized to induce mixing with the compressed airflow. Alternate, non-carbon based fuels such as hydrogen perform differently during combustion and therefore unconventional combustor/fuel injection arrangements are necessary to ensure a stable combustion process which delivers the desired turbine inlet temperature pattern, starting and durability while minimizing emissions. At the same time, in order to convert an existing engine design to use alternate fuels it is highly desirable to maintain the existing combustor dimensions. This is particularly important in aviation gas turbine engines, as increases in engine size or weight will have consequences for aircraft design.

Aircraft engine manufacturers continue to seek further improvements to engine performance including improvements to durability, emissions and propulsive efficiencies.

SUMMARY

A fuel mixture distribution system for a turbine engine assembly according to one example disclosed embodiment includes, among other possible things, a combustor that includes a combustion chamber, a fuel mixture distributor that includes an air conduit defining a mixing chamber between an air inlet and an exit opening to the combustion chamber, and a plurality of fuel passages that are disposed in the air conduit where a fuel flow is introduced and mixed with air in the mixing chamber prior to flowing through the exit opening into the combustion chamber. The air conduit shape is defined to achieve the desired mixing and prevent flashback at all operating conditions.

A combustor for a turbine engine according to another disclosed example embodiment includes, among other possible things, a combustor defining a combustion chamber, and a fuel mixture distributor that includes an air conduit defining a mixing chamber between an inlet and an exit opening to the combustion chamber. A plurality of fuel passages are disposed in the air conduit where a fuel flow is introduced and mixed with air in the mixing chamber and a secondary air inlet where air is introduced into the mixing chamber downstream of the plurality of fuel passages prior to flowing through the exit opening into the combustion chamber. The air conduit shape is defined to achieve the desired mixing and prevent flashback at all operating conditions.

A turbine engine assembly according to another disclosed example embodiment includes, among other possible things, a compressor section in flow series with a turbine section, a combustor that is disposed between the compressor section and turbine section, the combustor including a combustion chamber, and a fuel mixture distributor including an air conduit that defines a mixing chamber between an inlet and an exit opening to the combustion chamber. A plurality of fuel passages are disposed in the air conduit where a fuel flow is introduced and mixed with air in the mixing chamber and a secondary air inlet where air is introduced into the mixing chamber downstream of the plurality of fuel passages prior to flowing through the exit opening into the combustion chamber. A fuel system communicates a hydrogen fuel in a gaseous phase to the fuel mixture distributor.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
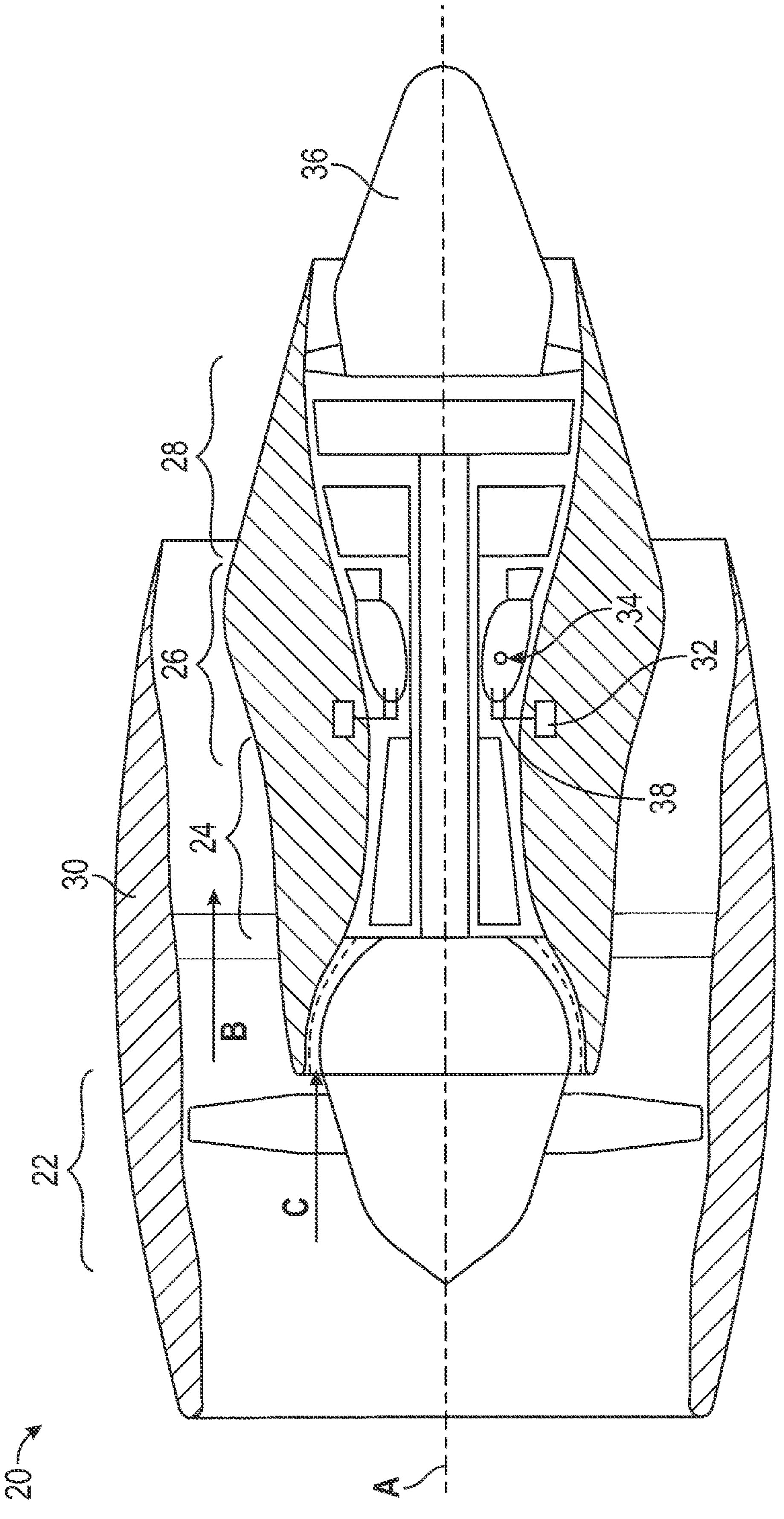
FIG. 1 is a schematic view of an example turbine engine embodiment.

FIG. 1 schematically illustrates a gas turbine engine 20. The example gas turbine engine 20 is a turbofan that generally incorporates a fan section 22, a compressor section 24, a combustor section 26 and a turbine section 28. The fan section 22 drives air along a bypass flow path B in a bypass duct defined within a nacelle 30. The turbine engine 20 intakes air along a core flow path C into the compressor section 24 for compression and communication into the combustor section 26. In the combustor section 26, the compressed air is mixed with fuel from a fuel system 32 and burnt to generate an exhaust gas flow that expands through the turbine section 28 and is exhausted through exhaust nozzle 36. Although depicted as a turbofan turbine engine in the disclosed non-limiting embodiment, it should be understood that the concepts described herein are not limited to use with turbofans as the teachings may be applied to other types of turbine engines. As one example, rather than having the propulsor be an enclosed fan, the propulsor may be an open propeller. An igniter 34 is provided in the combustor section 26 to aid ignition during starting operations.

Conventional hydrocarbon fuels are introduced into a combustor in a liquid form that is atomized to induce mixing with air. Alternative, non-carbon based fuels perform differently during combustion and therefore unconventional combustor/fuel injector arrangements are necessary to ensure a stable combustion process which delivers the desired turbine inlet temperature pattern, starting and durability while minimizing emissions. The disclosed example engine is designed to use gaseous hydrogen fuel. While it is conceptually possible to introduce hydrogen into the combustor in liquid form, hydrogen is more commonly introduced in a gas phase in gas turbine combustors in order to maintain stable combustion across the wide range of operating conditions required for an aviation gas turbine. As a gaseous fuel, hydrogen has a wider range of flammability and a higher flame velocity than conventional liquid fuels used in gas turbine engines, this results in changes in the flame pattern within the combustor which may influence the engine durability, starting, or emissions. Accordingly, the example combustor section 26 includes features tailored to operation using hydrogen fuel.

Accordingly, the example combustor section 26 includes features tailored to operation using hydrogen fuel including a fuel distributor 38 that induces mixing of the gaseous fuel and air to provide efficient combustion. The air and fuel flows are tailored in conjunction with the combustor holes to provide stable combustion and minimized emissions across the range of engine operating conditions, as well as good starting when ignited by the igniter 34. One fuel distributor 38 is shown by way of example, but more than one fuel distributor 38 would be utilized and spaced apart to distribute fuel and air around the circumference of the engine.

Figure 2:
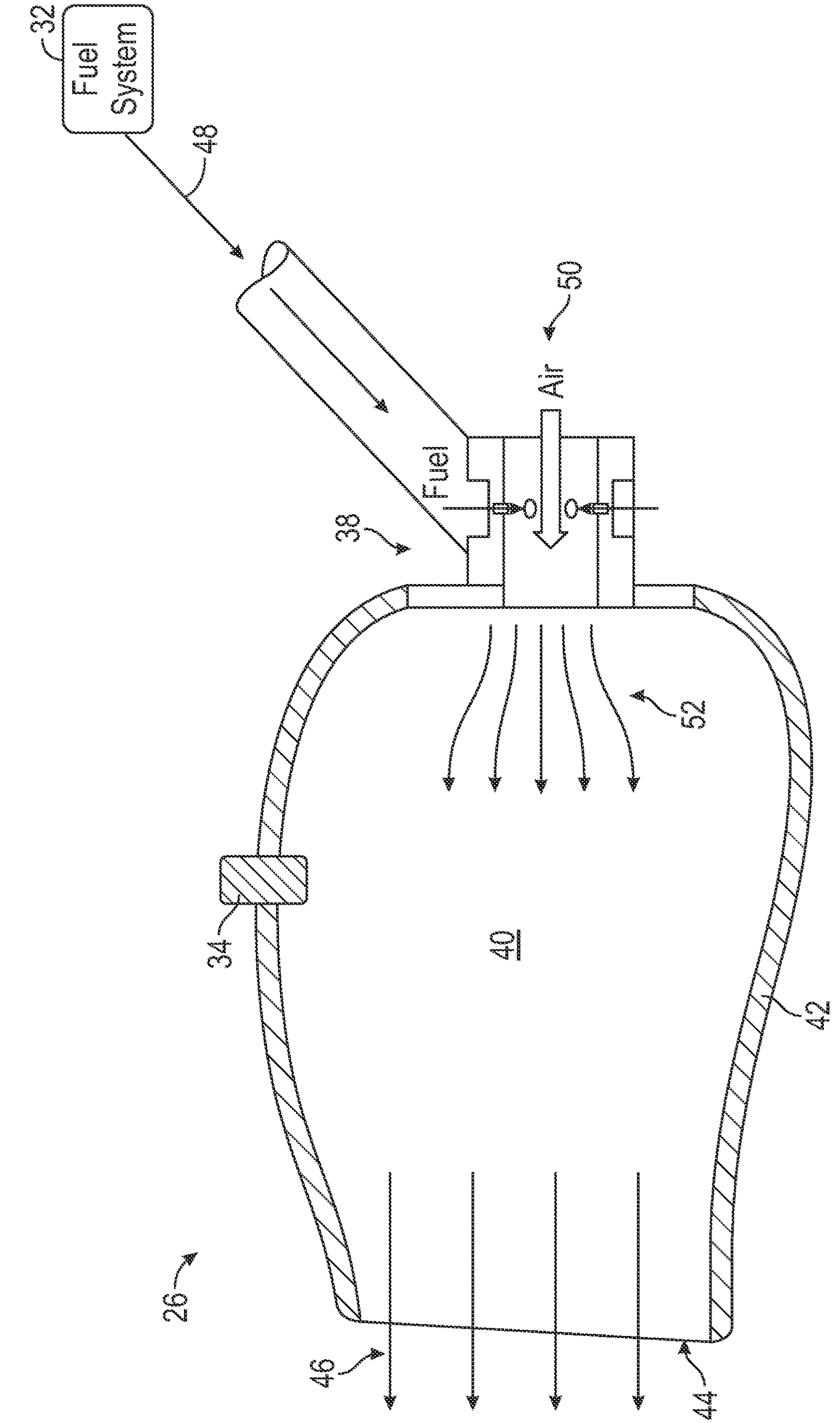
FIG. 2 is a simplified schematic view of an example combustor section.

Referring to FIG. 2, the combustor 26 includes a combustion chamber 40 defined by walls 42. The combustor 26 may be a full annular combustor or can combustor arranged about the engine axis A. Moreover, any combustor configuration is within the scope and contemplation of this disclosure.

A fuel distributor 38 disposed at an end of the combustor chamber 40 opposite an exit 44. The distributor 38 mixes a fuel flow 48 with a compressed air flow 50 to generate a fuel/air mixture 52 that is communicated into the combustor chamber 40. The fuel/air mixture 52 burnt to generate an exhaust gas flow 46 that is communicated thought the exit 44. Although one fuel distributor 38 is shown and described by way of example, more than one fuel distributor 38 would be utilized and spaced apart to supply a fuel/air mixture around the entire circumference of the combustor 26.

Figure 3:
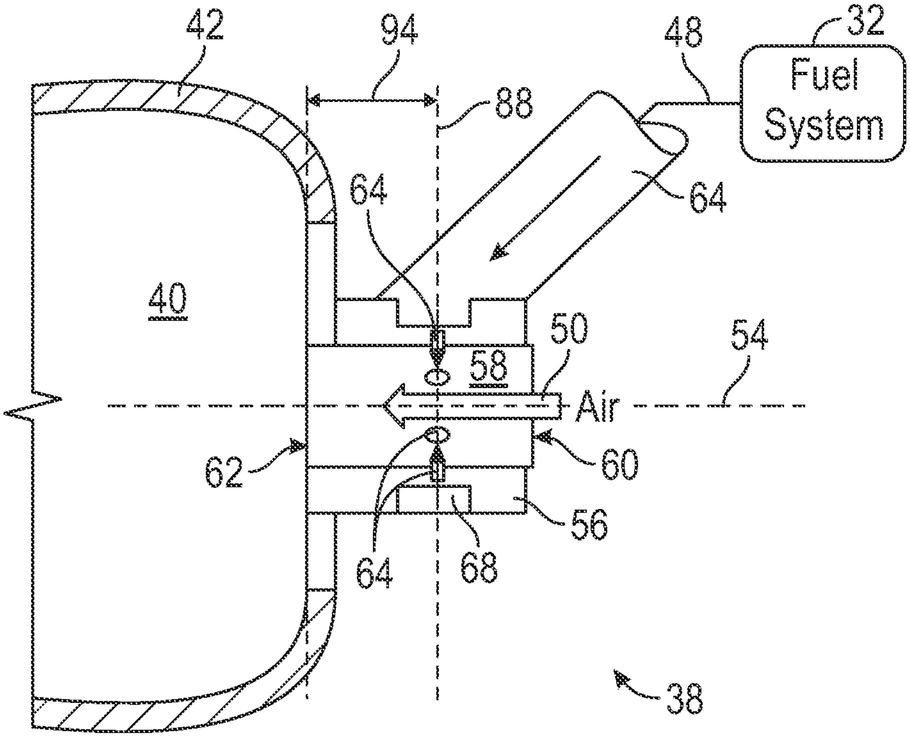
FIG. 3 is an enlarged schematic view of an example fuel distributor embodiment.

Referring to FIG. 3, The fuel mixture distributor 38 includes an air conduit 56 defining a mixing chamber 58 along an axis 54 between an inlet 60 and an exit opening 62 to the combustion chamber 40. The example air conduit 56 includes a uniform cross-section transverse to the axis 54 for the axial distance between the inlet 60 and the exit opening 62, however non-uniform cross-sections may be utilized depending on the requirements of the individual application and are also within the scope of the disclosure. A plurality of fuel passages 64 are disposed in the air conduit 56 and introduce a fuel flow 48 into the mixing chamber 58. The fuel flow 48 is injected transverse to the axis 54 and the flow of air 50 into the mixing chamber 58. The transvers injection of the fuel flow 48 prior to flowing through the exit opening 62 induces a mixing of the fuel and air to generate a fuel/air mixture prior to being introduced into the combustion chamber 40.

A conduit as used in this disclosure is defined by one or more structures that together convey a fluid from one point to another. For example, a conduit conveying fluid from point A to point B may include one of, or a combination of: a tube, an aperture defined through a part of an engine, a filter, a pump, and so on, depending on the application.

The plurality of fuel passages 64 are supplied by an annular passage 68 disposed within a wall of the air conduit 56. The fuel air passages 64 are disposed in a common plane 88 transverse to the axis 54. The common plane 88 is spaced an axial distance 94 apart from the exit opening 62. The axial distance 94 provides for mixing between the fuel 48 and the air flows 50. The axial distance 94 may be adjusted to provide a predefined amount of mixing tailored to application specific requirements. Moreover, the number and size of each of the fuel passages 64 may vary to introduce a sufficient amount of fuel for mixing and introduction into the combustion chamber 40.

Figure 4:
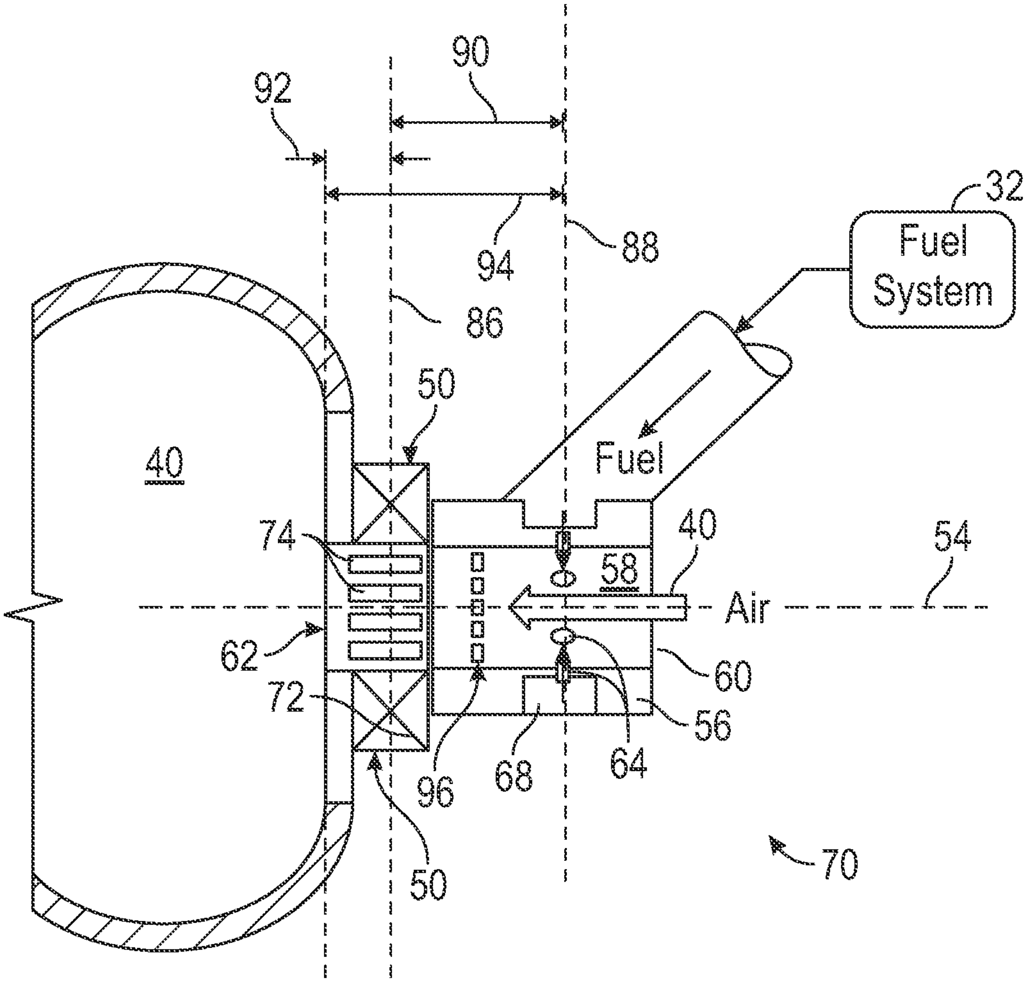
FIG. 4 is an enlarged schematic view of another example fuel distributor embodiment.

Referring to FIG. 4, another example fuel distributor is shown and indicated at 70. The fuel distributor 70 includes the addition of a secondary air inlet in the form of swirler 72. Air 50 is introduced into the mixing chamber 58 by the swirler 72 downstream of the plurality of fuel passages 64. The swirler includes a plurality of air passages 74 disposed about an inner periphery of the air conduit 56. A flame arrestor 96 in the form of a perforated plate is disposed between the air passages 74 and the fuel passages 64.

The air passages 74 are disposed within a common plane 86 that is transverse to the axis 54. The common plane 86 is spaced an axial distance 92 from the exit opening 62 and an axial distance 90 form the fuel passages 64. The axial distance 92 is much smaller than the axial distance 94 to fuel passages 64 disposed in the plane 88. The closer proximity of the air passages 74 provides for at least some of the induced swirling flow to carry into the combustor chamber 40.

Figure 5:
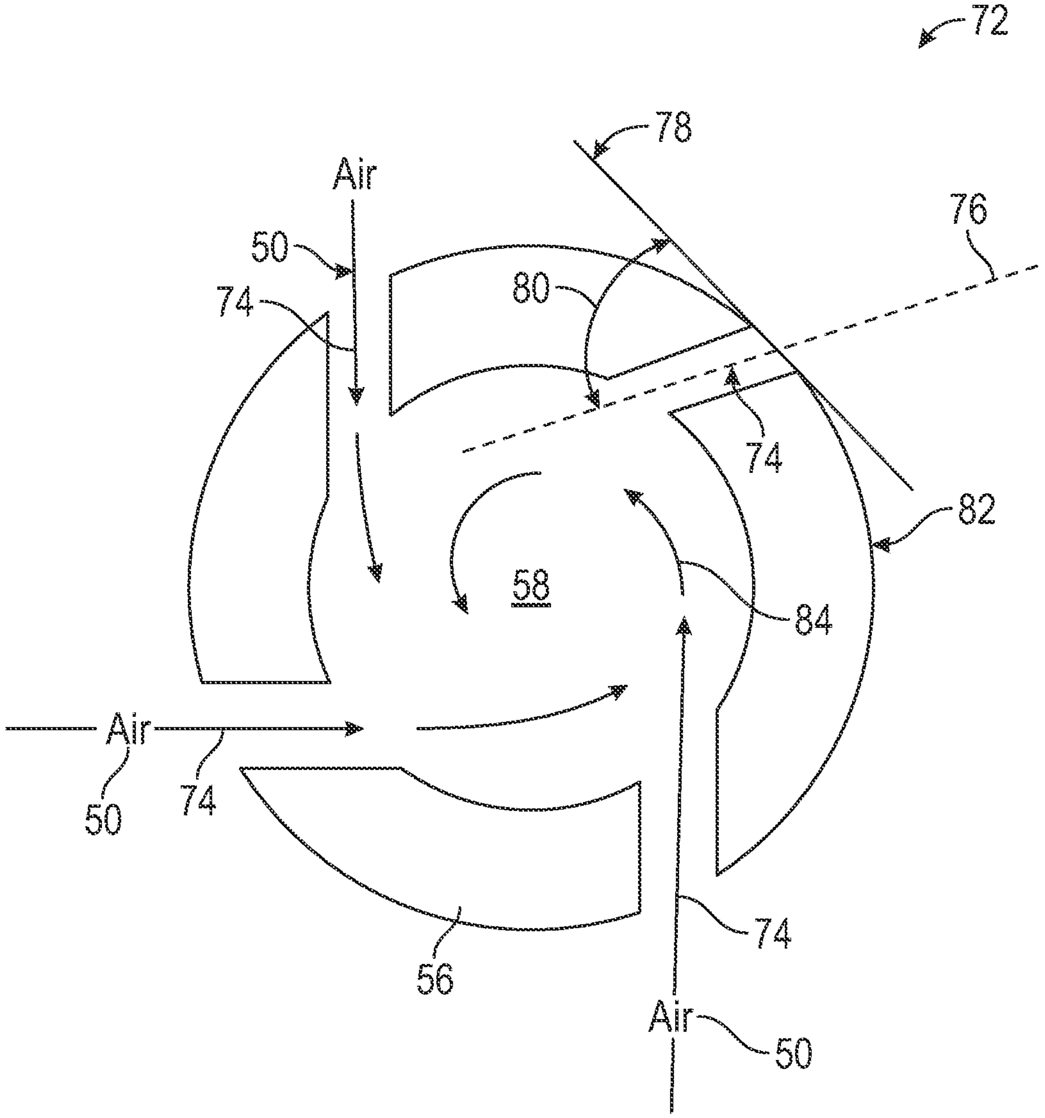
FIG. 5 is a schematic view of cross-section of a portion of the example fuel distributor.

Referring to FIG. 5, with continued reference to FIG. 4, the swirler 72 includes the air passages 74 that extend entirely through the air conduit 56. The air passages 74 are each disposed about an individual passage axis 76 that is disposed at an angle 80 relative to line 78 tangent to an outer surface 82 of the air conduit 56 for inducing a swirling secondary airflow 84 of a fuel air mixture communicated through the exit opening 62 into the combustion chamber 40.

The example fuel distributor 38 is operated at a stochiometric range of between 0.5 and 2. The size and number of air passages 74 and the size and shape of the mixing chamber 58 and fuel passages 64 may be adjusted to provide the desired stochiometric mixture of fuel and air communicated into the combustion chamber 40.

The example disclosed fuel distributors 38, 70 provides mixing of air and gaseous fuel prior to being introduced into the combustion chamber 40. Additionally, the example fuel distributor 70 induces a swirling flow in the fuel air mixture to aid in distribution upon entering the combustion chamber 40 to improve combustion operation and efficiency.

A fuel mixture distribution system 38 for a turbine engine assembly 20 according to one example disclosed embodiment includes, among other possible things, a combustor 26 that includes a combustion chamber 40, a fuel mixture distributor 38 that includes an air conduit 56 defining a mixing chamber 58 between an air inlet 60 and an exit opening 62 to the combustion chamber 40, and a plurality of fuel passages 64 that are disposed in the air conduit 56 where a fuel flow 48 is introduced and mixed with air in the mixing chamber 58 prior to flowing through the exit opening 62 into the combustion chamber 40. The air conduit shape is defined to achieve the desired mixing and prevent flashback at all operating conditions.

In a further embodiment of the foregoing, the fuel mixture distribution system 38 further includes a secondary air inlet 72 where air is introduced into the mixing chamber 58 downstream of the plurality of fuel passages 64.

In a further embodiment of any of the foregoing, the secondary air inlet 72 includes a plurality of air passages 74 that are disposed about a periphery of the air conduit 56. The air passages 74 include a passage axis 76 that is disposed at an angle relative to an outer surface 82 of the air conduit 56 for inducing a swirling secondary airflow 84 of a fuel air mixture 52 communicated through the exit 44 into the combustion chamber 40.

In a further embodiment of any of the foregoing, the plurality of air passages 74 extend through the air conduit 56.

In a further embodiment of any of the foregoing, the fuel mixture distribution system 38 includes a flame arrestor 96 that is disposed within the mixing chamber 58 between the plurality of fuel passages 64 and the secondary air inlet 60.

In a further embodiment of any of the foregoing, the plurality of fuel passages 64 extend through the air conduit 56 transverse to a central axis of the mixing chamber 58.

In a further embodiment of any of the foregoing, the fuel mixture distribution system 38 includes an annular passage 68 that is disposed about the air conduit 56 for communicating fuel to the plurality of fuel passages 64.

In a further embodiment of any of the foregoing, the plurality of fuel passages 64 are all disposed at a common axial distance from the exit opening 62.

In a further embodiment of any of the foregoing, the cross-section of the air conduit 56 is transverse to a central axis of the mixing chamber 58 for the axial distance between the inlet 60 and the exit opening 62 to the combustor 26. The air conduit 56 shape is defined to achieve the desired mixing and prevent flashback at all operating conditions.

A combustor 26 for a turbine engine 20 according to another example disclosed embodiment includes, among other possible things, a combustor 26 defining a combustion chamber 40, a fuel mixture distributor 38 that includes an air conduit 56 defining a mixing chamber 58 between an inlet 60 and an exit opening 62 to the combustion chamber 40, a plurality of fuel passages 64 are disposed in the air conduit 56 where a fuel flow 48 is introduced and mixed with air in the mixing chamber 58 and a secondary air inlet 72 where air is introduced into the mixing chamber 58 downstream of the plurality of fuel passages 64 prior to flowing through the exit opening 62 into the combustion chamber 40. The air conduit shape is defined to achieve the desired mixing and prevent flashback at all operating conditions.

In a further embodiment of the foregoing, the secondary air inlet 72 includes a plurality of air passages 74 that are disposed about a periphery of the air conduit 56. The air passages 74 include a passage axis 76 that is disposed at an angle relative to an outer surface 82 of the air conduit 56 for inducing a swirling secondary airflow 84 of a fuel air mixture 52 communicated through the exit 44 into the combustion chamber 40.

In a further embodiment of any of the foregoing, the plurality of air passages 74 extend through the air conduit 56.

In a further embodiment of any of the foregoing, the combustor 26 for a turbine engine 20 includes a flame arrestor 96 that is disposed within the mixing chamber 58 between the plurality of fuel passages 64 and the secondary air inlet 72.

In a further embodiment of any of the foregoing, the combustor 26 for a turbine engine 20 includes an annular passage 68 that is disposed about the air conduit 56 for communicating fuel to the plurality of fuel passages 64 and wherein the plurality of fuel passages 64 extend through the air conduit 56 transverse to the axis of the mixing chamber 58.

In a further embodiment of any of the foregoing, the plurality of fuel passages 64 are all disposed at a common axial distance from the exit opening 62.

A turbine engine assembly 20 according to another example disclosed embodiment includes, among other possible things, a compressor section 24 in flow series with a turbine section 28, and a combustor 26 that is disposed between the compressor section 24 and turbine section 28, the combustor 26 includes a combustion chamber 40. The turbine engine 20 further includes a fuel mixture distributor 38 that includes an air conduit 56 defining a mixing chamber 58 between an inlet 60 and an exit opening 62 to the combustion chamber 40, a plurality of fuel passages 64 that are disposed in the air conduit 56 where a fuel flow 48 is introduced and mixed with air in the mixing chamber 58 and a secondary air inlet 72 where air is introduced into the mixing chamber 58 downstream of the plurality of fuel passages 64 prior to flowing through the exit opening 62 into the combustion chamber 40. The turbine engine 20 further includes a fuel system 32 that communicates a hydrogen fuel in a gaseous phase to the fuel mixture distributor 38.

In a further embodiment of the foregoing, the secondary air inlet 72 includes a plurality of air passages 74 that are disposed about a periphery of the air conduit 56. The air passages 74 include a passage axis 76 that is disposed at an angle relative to an outer surface 82 of the air conduit 56 for inducing a swirling secondary airflow 84 of a fuel air mixture 52 communicated through the exit 44 into the combustion chamber 40.

In a further embodiment of any of the foregoing, the plurality of air passages 74 extend through the air conduit 56.

In a further embodiment of any of the foregoing, the turbine engine 20 includes a flame arrestor 96 that is disposed within the mixing chamber 58 between the plurality of fuel passages 64 and the secondary air inlet.

In a further embodiment of any of the foregoing, the turbine engine 20 includes an annular passage 68 that is disposed about the air conduit 56 for communicating fuel to the plurality of fuel passages 64 and the plurality of fuel passages 64 extend through the air conduit 56 transverse to a central axis of the mixing chamber 58 at a common axial distance from the exit opening 62.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A fuel mixture distribution system for a turbine engine assembly comprising:

a combustor including a combustion chamber;

a fuel mixture distributor including a single air conduit defining a mixing chamber that is disposed along a central axis of the fuel mixture distributor between an air inlet and an exit opening to the combustion chamber, a plurality of fuel passages extending through a wall of the air conduit transverse to the central axis disposed in the air conduit where a fuel flow is introduced into the airstream flowing through the mixing chamber and mixed with air in the mixing chamber prior to flowing through the exit opening into the combustion chamber, a secondary air inlet where air is introduced into the mixing chamber downstream of the plurality of fuel passages, and an annular passage disposed about the air conduit for communicating fuel to the plurality of fuel passages, the secondary air inlet comprises a plurality of air passages disposed about a periphery of the air conduit, each of the air passages including a passage axis that is disposed at an angle relative to an outer surface of the air conduit for inducing a swirling secondary air flow of the fuel air mixture communicated through the exit into the combustion chamber, and wherein the air conduit has a uniform cross-section transverse to the central axis of the mixing chamber between the inlet and the exit opening to the combustor to achieve the desired mixing and prevent flashback at all operating conditions.

2. The fuel mixture distribution system as recited in claim 1, wherein the plurality of air passages extend through the air conduit.

3. The fuel mixture distribution system as recited in claim 1, including a flame arrestor disposed within the mixing chamber between the plurality of fuel passages and the secondary air inlet.

4. The fuel mixture distribution system as recited in claim 1, wherein the plurality of fuel passages are all disposed at a common axial distance from the exit opening.

5. A combustor for a turbine engine comprising:

a combustor defining a combustion chamber;

a fuel mixture distributor including an air conduit defining a single mixing chamber that is disposed along a central axis of the fuel mixture distributor between an inlet and an exit opening to the combustion chamber, a plurality of fuel passages extending through a wall of the air conduit transverse to the central axis disposed in the air conduit where a fuel flow is introduced transversely into an airstream flowing through the mixing chamber and mixed with air in the mixing chamber and a secondary air inlet where air is introduced into the mixing chamber downstream of the plurality of fuel passages prior to flowing through the exit opening into the combustion chamber, wherein the air conduit is of a uniform cross-section transverse to the central axis through the inlet and extending into the exit opening, the air conduit shape being defined to achieve the desired mixing and prevent flashback at all operating conditions, wherein the air conduit defines a uniform cross-sectional area transverse to the axis through the inlet and extending through the exit opening.

6. The combustor for a turbine engine as recited in claim 5, wherein the secondary air inlet comprises a plurality of air passages disposed about a periphery of the air conduit, the air passages including a passage axis that is disposed at an angle relative to an outer surface of the air conduit for inducing a swirling secondary airflow of a fuel air mixture communicated through the exit into the combustion chamber.

7. The combustor for a turbine engine as recited in claim 6, wherein the plurality of air passages extend through the air conduit.

8. The combustor for a turbine engine as recited in claim 6, including an annular passage disposed about the air conduit for communicating fuel to the plurality of fuel passages and wherein the plurality of fuel passages extend through the air conduit transverse to the central axis of the mixing chamber.

9. The combustor for a turbine engine as recited in claim 5, including a flame arrestor disposed within the mixing chamber between the plurality of fuel passages and the secondary air inlet.

10. The combustor for a turbine engine as recited in claim 5, wherein the plurality of fuel passages are all disposed at a common axial distance from the exit opening.

11. A turbine engine assembly comprising;

a compressor section in flow series with a turbine section;

a combustor disposed between the compressor section and turbine section, the combustor including a combustion chamber;

a fuel mixture distributor including a single air conduit defining a mixing chamber disposed about a central axis of the fuel mixture distributor between an inlet and an exit opening to the combustion chamber, a plurality of fuel passages extending through a wall of the air conduit transverse to the central axis disposed in the air conduit where a fuel flow is introduced into an airstream flowing through the mixing chamber and mixed with air in the mixing chamber and a secondary air inlet where air is introduced into the mixing chamber downstream of the plurality of fuel passages prior to flowing through the exit opening into the combustion chamber, wherein the air conduit is of a uniform cross-section transverse to the central axis through the inlet and extending through the exit opening; and a fuel system communicating a hydrogen fuel in a gaseous phase to the fuel mixture distributor.

12. The turbine engine as recited in claim 11, wherein the secondary air inlet comprises a plurality of air passages disposed about a periphery of the air conduit, the air passages including a passage axis that is disposed at an angle relative to an outer surface of the air conduit for inducing a swirling secondary airflow of a fuel air mixture communicated through the exit into the combustion chamber.

13. The turbine engine as recited in claim 12, wherein the plurality of air passages extend through the air conduit.

14. The turbine engine as recited in claim 11, including a flame arrestor disposed within the mixing chamber between the plurality of fuel passages and the secondary air inlet.

15. The turbine engine as recited in claim 11, including an annular passage disposed about the air conduit for communicating fuel to the plurality of fuel passages and wherein the plurality of fuel passages extend through the air conduit transverse to the central axis of the mixing chamber at a common axial distance from the exit opening.

* * * * *